United States Patent [19]
Tsuji et al.

[11] 3,995,111
[45] Nov. 30, 1976

[54] TRANSMIT PHASE CONTROL SYSTEM OF SYNCHRONIZATION BURST FOR SDMA/TDMA SATELLITE COMMUNICATION SYSTEM

[75] Inventors: Yoshikazu Tsuji; Yoshiro Tada, both of Kawasaki, Japan

[73] Assignee: Fujitsu Ltd., Japan

[22] Filed: Feb. 21, 1975

[21] Appl. No.: 551,676

[30] Foreign Application Priority Data
Feb. 26, 1974 Japan.............................. 49-22524

[52] U.S. Cl. ..................... 178/69.5 R; 179/15 BS; 325/4; 325/58
[51] Int. Cl.² ........................................... H04J 3/06
[58] Field of Search ............ 178/69.5 R; 179/15 BS; 325/4, 58, 156, 157, 158; 343/100 ST

[56] References Cited
UNITED STATES PATENTS

| | | |
|---|---|---|
| 3,562,432 | 2/1971 | Gabbard.......................... 179/15 BS |
| 3,566,267 | 2/1971 | Golding.......................... 179/15 BS |
| 3,593,138 | 7/1971 | Dunn et al........................... 325/58 |
| 3,654,395 | 4/1972 | Schmidt.......................... 179/15 BS |
| 3,710,027 | 1/1973 | Herter et al..................... 178/69.5 R |
| 3,816,666 | 6/1974 | Tomozawa et al............. 179/15 BS |
| 3,824,548 | 7/1974 | Sullivan et al. ............... 178/69.5 R |
| 3,829,777 | 8/1974 | Muratani et al. ...................... 325/4 |
| 3,836,721 | 9/1974 | Sugioka........................... 178/69.5 R |
| 3,858,007 | 12/1974 | Ganssmantel................... 178/69.5 R |
| 3,879,581 | 4/1975 | Schlosser et al. ............... 179/15 BS |

Primary Examiner—Malcolm A. Morrison
Assistant Examiner—Errol A. Krass
Attorney, Agent, or Firm—Staas & Halsey

[57] ABSTRACT

A transmit phase control system of synchronization burst is disclosed for use in a SDMA/TDMA satellite communication system in which a phase error between a synchronization burst transmitted from an earth station and a synchronization window, assigned as a time slot on a satellite for returning the synchronization burst, is measured and the transmit phase of the synchronization burst is controlled based on the measured value. Phase error measurement is achieved a plurality of times in connection with the received synchronization burst of each station, and a decided phase error is derived based on the measured value obtained by the plurality of measurements. The transmit phase of the synchronization burst is then controlled in accordance with the decided phase error. Further, the phase error decision is achieved at every $1/n$ ($n$ being an integer larger than 1) round trip and the present synchronization burst is transmitted with its transmit phase corrected corresponding to a value that is the sum of the phase corrected value of the $n$ preceding phase correction instants subtracted from the decided phase error at the present instant.

6 Claims, 12 Drawing Figures

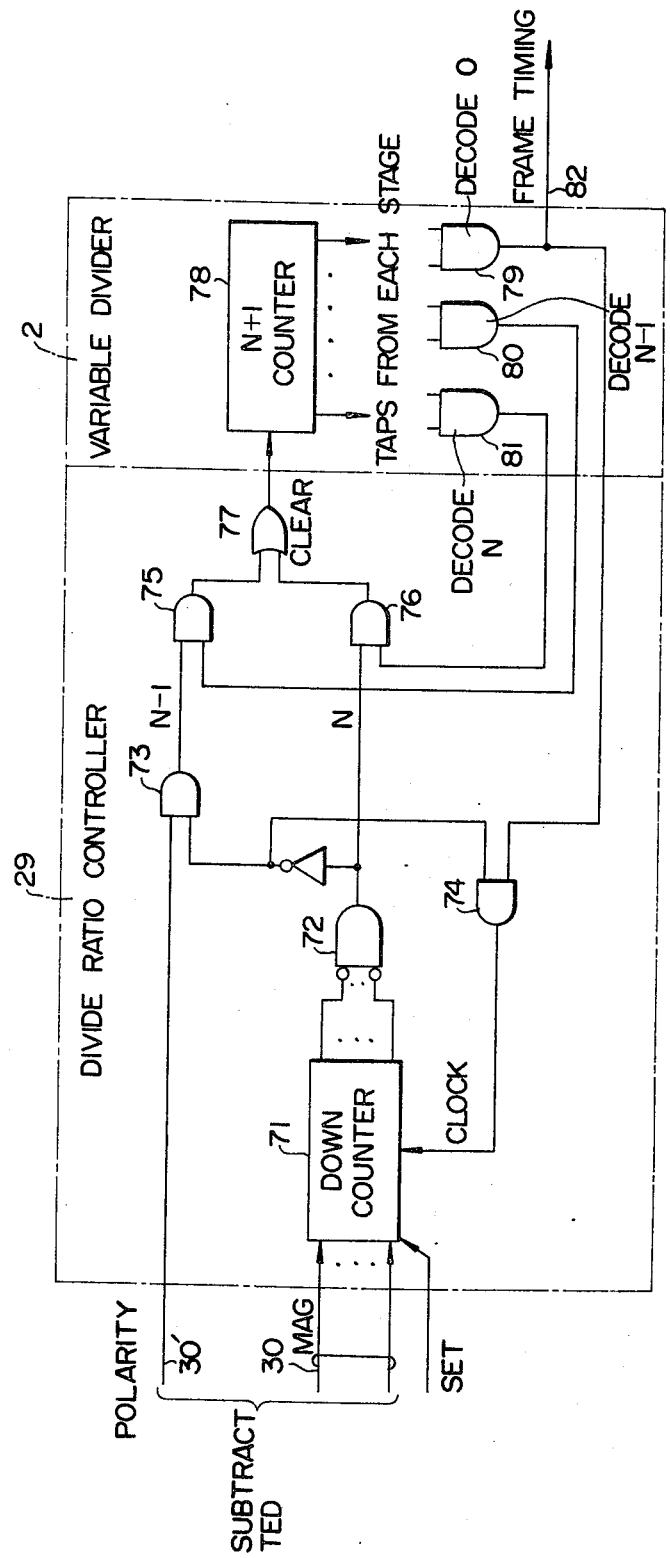

TRANSMIT PHASE CONTROL SYSTEM OF SYNCHRONIZATION BURST FOR SDMA/TDMA SATELLITE COMMUNICATION SYSTEM

BACKGROUND OF THE INVENTION

1. Field of the Invention

This invention relates to an SDMA (Space Division Multiple Acess)/TDMA(Time Division Multiple Access) satellite communication system.

2. Description of the Prior Art

Strictly speaking, the SDMA/TDMA satellite communication system is referred to as SDMA/SS-TDMA (Space Division Multiple Acess/Spacecraft Switched-Time Division Multiple Access). Such a system is viewed as a satellite communication system of large capacity based on the TDMA system.

With this system, a satellite contains a spot beam antenna which irradiates a relatively small zone unlike a conventional global beam antenna. Namely, the satellite contains several spot beam antennas and each spot beam corresponds to one zone without interference with the other beams. The same frequency is employed in common to the respective spot beams and a multiple access is achieved. The satellite contains a switching matrix having inputs and outputs corresponding to the respective spot beam zones. The transmission and reception of signals are achieved among the spot beam zones in accordance with a time sequence predetermined by clock pulses from a reference oscillator incorporated in the satellite. Further, in each spot beam zone, access is effected on the conventional TDMA system.

FIG. 1 shows a basic model of the SDMA/TDMA satellite communication system (hereinafter referred to as the SDMA/TDMA system, for the saake of brevity). In the case of FIG. 1, three spot beam zones No. 1, No. 2 and No. 3 exist and each spot beam zone covers three earth stations. Namely, earth stations No. 11, No. 12 and No. 13 belong to the spot beam No. 1; while earth stations No. 21, No. 22, No. 23 and No. 31, No. 32, No. 33 respectively belong to the spot beam zones No. 2 and No. 3.

The satellite contains a switching matrix SM, by which TDMA signals of the spot beam zones No. 1, No. 2 and No. 3 are suitably connected among them. FIGS. 2(a), 2(b) and 2(c) combine to illustrate an example of a basic time chart of one frame, including signal transmission and reception among the spot beam zones No. 1, No. 2 and No. 3. FIG. 2(a) shows a burst train which is applied to the switching matrix SM of the satellite from the spot beam zone No. 1. IN FIG. 2(a), reference character SB indicates a synchronization burst, derived fromthe spot beam zone No. 1 and returned thereto. Reference character DB designates data bursts, which show that signals from the earth stations No. 11, No. 12 and No. 13 are sequentially transmitted respectively to the spot beam zones No. 3, No. 1 and No. 2 in a time divisional manner. FIG. 2(b) shows the time sequence of switching (hereinafter referred to as the switching sequence) of the switching matrix SM of the satellite. In FIG. 2(b), reference character SW denotes a synchronization window, which is a time slot assigned for returning a synchronization burst of each spot beam zone to the spot beam zone from which it is transmitted. Reference character DW identifies data windows, which are time slots assigned for transmission and reception of data signals among the spot beam zones in a predetermined time sequence. FIG. 2(c) shows a burst train from the switching matrix SM of the satellite to the spot beam zone No. 1.

The feature of the SDMA/TDMA system resides in the frame synchronization established in synchronism with the switching sequence of the satellite. This synchronization is obtained by transmitting the synchronization burst SB from each of the earth stations of each spot beam zone to the synchronization window SW on the satellite and controlling the synchronization burst SB to bear a correct phase relation on the satellite. For the following reason, all of the earth stations of each spot beam zone are required to transmit the synchronization burst SB. Namely, in the SDMA/TDMA system, only the synchronization window SW provided on the satellite is guaranteed as the time slot for returning the synchronization burst of each spot beam zone but the data window DW which is the time slot other than the synchronization window SW is not always guaranteed as the time slot for the returning use. However, in FIG. 2, the time slot for the returning use is shown. Accordingly, unless the earth stations of each spot beam zone each transmit the synchronization burst SB towards the synchronization window SW which is the time slot for the returning use, frame synchronization cannot be obtained. Consequently, the synchronization bursts SB of all the earth stations of each spot beam zone access the synchronization window SW. The method therefore may be, for example, a frequency division or time division type.

FIG. 3 illustrates one example of the synchronization burst SB and the manner in which the synchronization is established in FIG. 2. It is called a PN-PSK(Pseudo Noise-Phase Shift Keying) synchronization signal. In FIG. 3, reference character PW indicates a preamble word for carrier reproducing and for bit timing reproducing; SIC designates a station identification cord; and MB identifies metric bits (Which imply bits to be measured). The decision of establishment of synchronization with the synchronization window SW, in the case of employing the synchronization burst (signal) SB, is achieved in the following manner. That is, the metric bits MB of the synchronization burst SB, which are composed of 2K bits, are overlapped on the synchronization window SW on the satellite in the vicinity of its fall. The difference between the number of bits from a first metric bit correctly received by the earth station to a first incorrectly received metric bit is relative to a measure of the phase error, and since only noises are received after the metric bits are cut off by the synchronization window SW, and the probability of erroneous reception increases. When the measured phase difference is zero, complete synchronization is established. Accordingly, FIG. 3 shows the state that complete synchronization is established. Where the measured phase difference is not zero, the synchronization burst SB has a phase difference relative to the synchronization window SW, so that it is necessary to control (correct) the transmit phase of the synchronization burst SB based on the measured value of phase error.

As described above, in the SDMA/TDMA system, for controlling the transmit phase of the synchronization burst SB of each spot beam zone, use is made of a time slot for returning use which is called the synchronization window SW of the switching sequence generated on the satellite. Namely, by correct synchronization of all the earth stations of each spot beam zone with the synchronization window SW on the satellite, normal communication among the spot beam zones is made possible.

The present invention concerns a system for controlling the transmit phase of the synchronization burst SB in such an SDMA/TDMA system as described above.

With a system for controlling the transmit phase of the synchronization burst SB of the conventional TDMA system, after the synchronization burst SB (of the station) phase-corrected at the preceding transmit phase control (correction) instant is received, a phase error measurement is achieved once and then phase correction is effected based on the measured value. Namely, in the TDMA system, frame synchronization of all the earth stations is accomplished by controlling the difference in receiving timing between the synchronization burst SB of a reference station of the earth stations and the synchronization burst SB of each station. However, in the SDMA/TDMA system the phase error measurement is achieved by utilizing the synchronization window SW of the switching sequence generated on the satellite, for example, by detecting the amount of the synchronization burst SB cut off the synchronization window SW, as described previously, so that frame synchronization among the spot beam zones is greatly affected by the rise/fall characteristic of the synchronization window SW and noises. Namely, in the example of FIG. 3, at a certain measuring instant, the respective metric bits are decided to be 1 or 0 for every bit. Even if only noise is received, the probability that the metric bit is decided to be 1 or 0 is ½. Accordingly, in the SDMA/TDMA system, even by effecting the phase error measurement after once receiving the synchronization burst SB of each station as in the conventional TDMA system, a decision error is inevitably introduced in the measurement and a correct phase error is not obtained. Therefore, it is impossible to achieve a correct transmit phase control of the synchronization burst.

SUMMARY OF THE INVENTION

The object of the present invention is to provide a transmit phase control system of the synchronization burst which is free from the aforesaid defects in the prior art and suitable for use in the SDMA/TDMA system.

According to the present invention of the transmit phase control system of the synchronization burst in the SDMA/TDMA satellite communication system, a phase error between a synchronization burst transmitted from an earth station and the synchronization window, which is a time slot assigned on a satellite for returning the synchronization burst, is measured. The transmit phase of the synchronization burst is controlled in accordance with the measured value and the abovesaid phase error measurement is achieved in each station a plurality of times in connection with its synchronization burst being received. A decision phase error is decided based on the measured values obtained by the plurality of measurements and the transmit phase of the aforesaid synchronization burst is controlled in accordance with the decided phase error. Further, the abovesaid phase error decision is achieved at every $1/n$ round trip ($n$ being an integer larger than 1) and the synchronization burst is transmitted after being phase corrected corresponding to the value of the sum of phase corrected values of the n preceding phase correction instants subtracted from the decided phase error at the present instant.

BRIEF DESCRIPTION OF THE DRAWINGS

FIG. 10 is detailed diagram of one example showing the divide ratio controller and the variable devider of FIG. 7.

DESCRIPTION OF THE PREFERRED EMBODIMENTS

With reference to the drawings, the principles and embodiments of this invention will hereinafter be described in detail.

Figure 4:
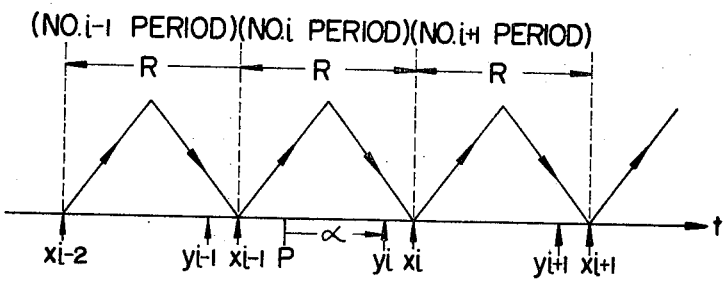
FIG. 4 is a diagram for explaining the principles of phase error decision according to this invention wherein a correction is made possible at every round trip R.

FIG. 4 is a diagram, for explaining the principles of this invention. In FIG. 4, reference character R indicates the time for a one-round trip, that is, the time in which a synchronization burst SB transmitted from an earth station is received again by that station. The reference character $x$ designates the amount of phase correction applied to of the synchronization burst SB by the earth station at each transmit phase correction instant; and $x_i$ indicates the amount of phase correction in an $i$th period. The abscissa represents time $t$.

The transmit phase control system of the synchronization burst according to this invention, is one which measures the phase error between the synchronization burst SB and the synchronization window SW a plurality of times in connection with the received synchronization burst of each earth station. A determined phase error is decided based on the measured value obtained by the plurality of measurements and the transmit phase of the synchronization burst is controlled in accordance with the decided phase error. Namely, in FIG. 4, the decided phase error value $y_i$ in the $i$th period is obtained by measuring a plurality of times the synchronization burst received for a period of time $\alpha$ from the instant P at which the synchronization burst phase error measurement of the $i$th period is started.

The transmit phase control system of the synchronization burst according to this invention is one in which, before the synchronization burst SB which was phase corrected at a phase correction instant (the amount of phase corrected being $x_{i-1}$ at a final instant of an ($i-1$)th period) is received at the final instant of the $i$th period, a phase error decision is achieved and the phase of the synchronization burst SB to be transmitted is corrected by the quantity of difference $x_i$ between the decided value $y_i$ and the aforesaid quantity of phase corrected $x_{i-1}$. The decided value $y_i$ is determined according to the error contained in the received synchronization burst corrected by the amount $x_{i-2}$.

In the present invention, the decided value $y_i$ is not used as the amount $x_i$ of phase to be corrected at the $i$th phase correction instant. The amount $x_{i-1}$ of phase already corrected at the preceding ($i-1$) phase correction instant is substracted from the decided value $y_i$ and the difference is used for phase correction. Therefore since the transmit phase of the synchronization burst SB in the $i$th period is one that has been corrected by the amount $x_{i-2}$ and by the amount $x_{i-1}$, the decided value $y_i$ is one that has been decided by receiving the synchronization burst SB transmitted after being phase corrected by the amount $x_{i-2}$. It is sufficient to correct the transmit phase of the synchronization burst SB using the difference between the decided phase error value $y_i$ and amount of phase corrected $x_{i-1}$ as the amount of phase corrected $x_i$, at the $i$th phase correction instant.

That is, these relationships are expressed by the following equations:

$$y_i = y_{i-1} + d_i - x_{i-2} \tag{1}$$

$$x_i = y_i{}^* - x_{i-1} \tag{2}$$

where $d_i$ indicates the amount of phase changed due to a clock drift in the $i$th period and $y_i{}^*$ indicates a quantized value of the measured value $y_i$.

With such a transmit phase control system of the synchronization burst according to this invention, even though the phase error decision requires an appreciable amount of time, the phase control (correction) of the synchronization burst SB is made possible at every one round trip R, thus providing for enhanced synchronization accuracy. Namely, in FIG. 4, the decided phase error value $y_i$ in the $i$th period is obtained by measuring a plurality of times the synchronization burst received for a period of time $\alpha$ from the instant P at which the synchronization burst phase error measurement of the $i$th period is started. With such a method as employed in the conventional TDMA system in which a phase error decision is achieved after the synchronization burst SB phase corrected in the preceding period is received and then the transmit phase of the synchronization burst SB is corrected, the phase correction is effected at time intervals of (R + $\alpha$) at the shortest.

Further, the present invention enables $n$ phase corrections for every one-round trip R. In this case, it is necessary that, at each instant of the phase correction of the synchronization burst SB, the difference between the decided phase error at the present instant and the sum of amounts of phase corrected at the $n$ preceding phase correction instants is used as a new amount of phase to be corrected.

Figure 5:
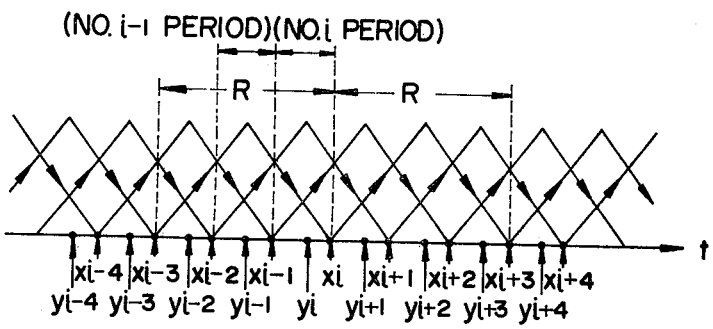
FIG. 5 is a diagram for explaining the principles of phase error decision according to this invention wherein a correction is made possible n times for every round trip R.

FIG. 5 is a diagram for explaining the principles of the above operation. In this case, the phase correction is achieved three times during one-round trip R. In FIG. 5, if the phase error of the synchronization burst SB decided at the phase error decision instant in the $i$th period is taken as $y_i$ and if the amount of transmit phase of the synchronization burst SB at the phase correction point is taken as $x_i$, the following relationships hold:

$$y_i = y_{i-1} + d_i - x_{i-4}$$

$$x_i = y_i{}^* - \sum_{k=1}^{3} x_{i-k}$$

In FIG. 5, one period corresponds to ⅓ of the one-round trip, that is, R/3.

And, in general, in the case of effecting the phase correction $n$ times in the one-round trip R, the following relationships hold:

$$y_i = y_{i-1} + d_i - x_{i-(n+1)} \tag{3}$$

$$x_i = y_i{}^* - \sum_{k=1}^{n} x_{i-k} \tag{4}$$

Next, a description will be given of stable operation of the synchronization burst transmit phase control system of this invention. At first, in the case of one phase correction for the one-round trip R, the following values of $x$ and $y$ are obtained from the equations (1) and (2):

$$y_3 = y_2 + d_3 - x_1$$
$$y_4 = y_3 + d_4 - x_2$$
$$\quad = y_2 + d_3 + d_4 - x_1 - x_2$$
$$y_5 = y_4 + d_5 - x_3$$
$$\quad = y_2 + d_3 + d_4 + d_5$$
$$\quad - x_1 - x_2 - x_3$$
$$\quad = (y_2 + d_3) - (Y_2 + d_3)^*$$
$$\quad + d_4 + d_5$$
$$y_6 = y_5 + d_6 - x_4$$
$$\quad = (y_2 + d_3 + d_4) - (y_2 + d_3 + d_4)^*$$
$$\quad + d_5 + d_6$$

$$x_3 = y^*_3 - x_2$$
$$\quad = (Y_2 + d_3 - x_1)^* - x_2$$
$$\quad = (y_2 + d_3)^* - x_1 - x_2$$
$$x_4 = y^*_4 - x_3$$
$$\quad = (y_2 + d_3 + d_4)^* - (y_2 + d_3)^*$$
$$x_5 = (y_2 + d_3 + d_4 + d_5)^*$$
$$\quad - (y_2 + d_3 + d_4)^*$$

Generally, $y_i$ is expressed in the following form:

$$y_i = (y_2 + \sum_{k=3}^{i-2} d_k) - (y_2 + \sum_{k=3}^{i-2} d_k)^* + \sum_{k=i-1}^{i} d_k = A+B$$

where A is a quantization error and is given as follows:

$$A = (y_2 + \sum_{k=3}^{i-2} d_k - (y_2 + \sum_{k=3}^{i-2} d_k)^*,$$

and B is a clock drift in the $(i-1)$th and ith periods and is expressed as follows:

$$B = \sum_{k=i-1}^{i} d_k$$

Accordingly, $y_i \leq$ a maximum quantization error + a clock drift for two round trips, by which stability of the system is guaranteed.

Similarly, in the case of $n$ phase corrections in one round trip R, the phase error $y_i$ is obtained from the equations (3) and (4) as follows:

$$y_i = (y_{n+1} + \sum_{k=n+2}^{i-(n+1)} d_k) - (y_{n+1} + \sum_{k=n+2}^{i-(n+1)} d_k)^*$$
$$+ \sum_{k=i-n}^{i} d_k = A + B$$

where $$A = (y_{n+1} + \sum_{k=n+2}^{i-(n+1)} d_k) - y_{n+1} + \sum_{k=n+2}^{i-(n+1)} d_k)^* \text{ and }$$

$$B = \sum_{k=i-n}^{i} d_k$$

A indicates a quantization error and B indicates the sum of clock drifts from the $(i-n)$th period. Since one period corresponds to a $1/n$ round trip, B corresponds to the clock drift in a $n+1/n$ round trip.

Accordingly, $y \leq$ a maximum quantization error + the clock drift for the $n+1/n$ round trip, and stability of the system is guaranteed.

Figure 6:
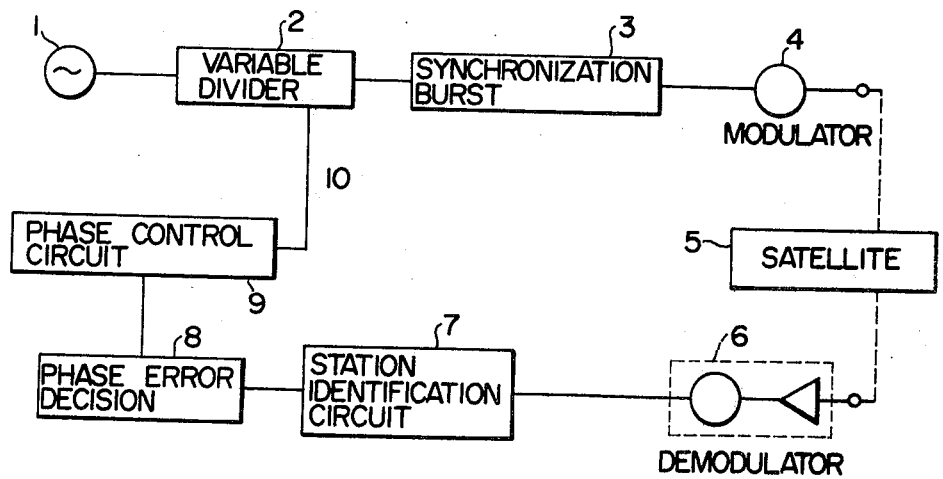
FIG. 6 is a block diagram showing the construction of an earth station synchronization device for the practice of this invention.

FIG. 6 illustrates the construction of an earth station synchronizing device containing the transmit phase control system of the synchronization burst in the SDMA/TDMA system according to this invention. In FIG. 6, a standard clock signal is derived from a standard clock generator 1 is frequency divided by a frequency divider 2 to provide a frame timing and a synchronization burst SB is produced by a synchronization burst generator 3 at the frame timing and transmitted to a satellite 5 through a modulator 4. The synchronization burst SB received again by the earth station through the satellite 5 is applied to a phase error measuring and deciding circuit 8 through a demodulator 6 and a station identification circuit 7. In the phase error measuring and deciding circuit 8, the difference between the synchronization window SW on the satellite 5 and the synchronization burst SB of the earth station is decided. Based on the decided value, a phase control circuit 9 generates a phase control signal 10 and, by controlling the frequency dividing ratio of the frequency divider 2, the transmit phase of the synchronization burst SB is controlled.

Figure 1:
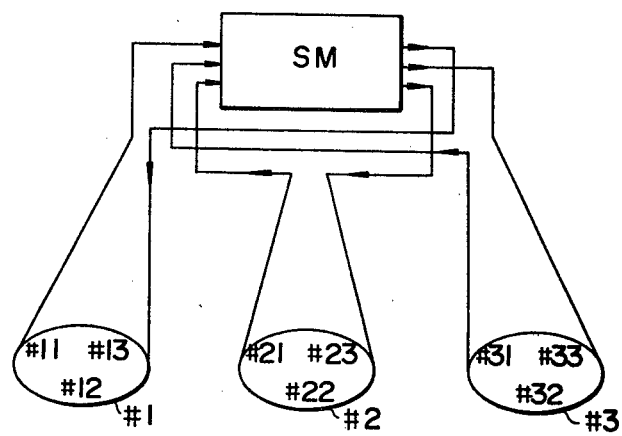
FIG. 1 is a schematic diagram for a general explanation of an SDMA/TDMA satellite communication system to which this invention is applied.
Figure 2:
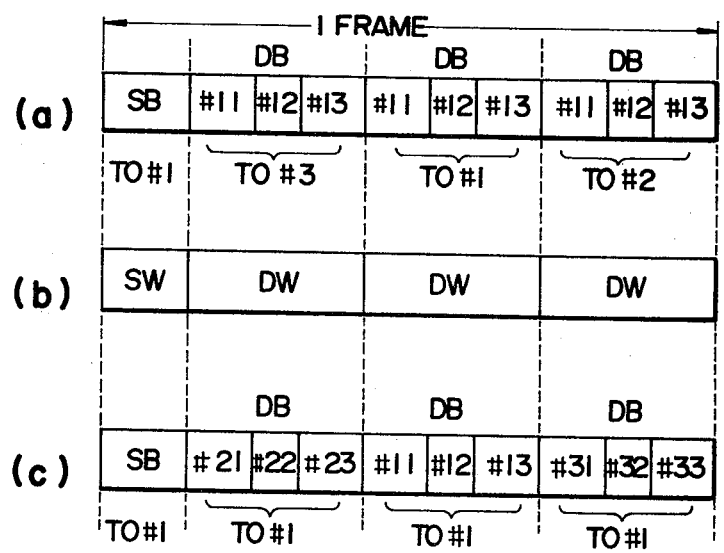
FIGS. 2(a), 2(b) and 2(c) are charts showing the time sequence switching in a switching matrix in a satellite.
Figure 3:
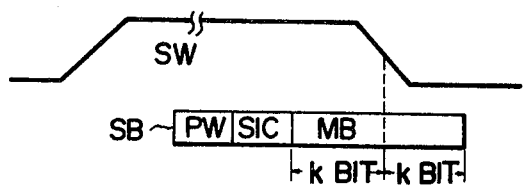
FIG. 3 illustrates one example of a synchronization burst and a synchronization window as represented in FIGS. 2(a), 2(b) and 2(c) and the manner in which synchronization is established.
Figure 7:
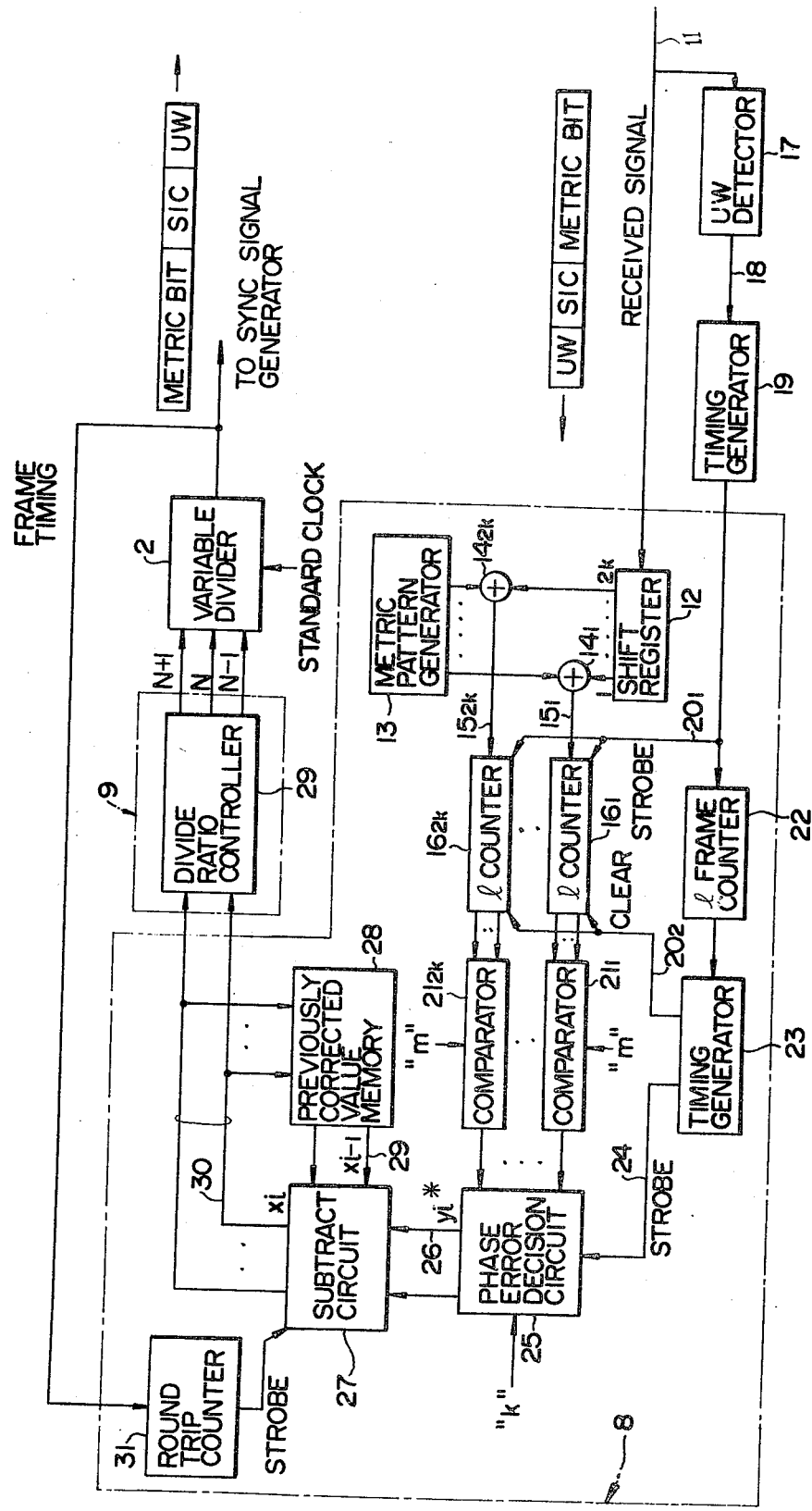
FIG. 7 is an explanatory block diagram illustrating the construction of one example of a phase error measuring and deciding circuit as shown in FIG. 6.

FIG. 7 shows in detail the phase measuring and deciding circuit 8 and the phase control circuit 9 in FIG. 6. In FIG. 7, reference numeral 11 indicates the synchronization burst SB (the number bits 2K) transmitted from the station identification circuit 7, which is sequentially applied to shift register 12 of the phase error measuring and deciding circuit 8 indicated by the broken line. The contents of the shift register 12 are compared with the corresponding contents (the number of bits 2K) of a metric pattern generator 13 by means of exclusive OR circuits $14_1$ to $14_{2K}$. Decision signals $15_1$ to $15_{2K}$ which are 0 and 1 depending upon whether or not the compared signals are correspondingly coincident with each other, are applied to scale-of-$l$ counters $16_1$ to $16_{2K}$. Reference numeral 17 designates a unique word (UW) detector which is shunted from the synchronization burst (SB) 11 to detect a unique word UW (not shown) contained in a preamble word PW (shown in FIG. 3) of the synchronization burst SB and apply a UW detection signal 18 to a timing generator 19.

Figure 8:
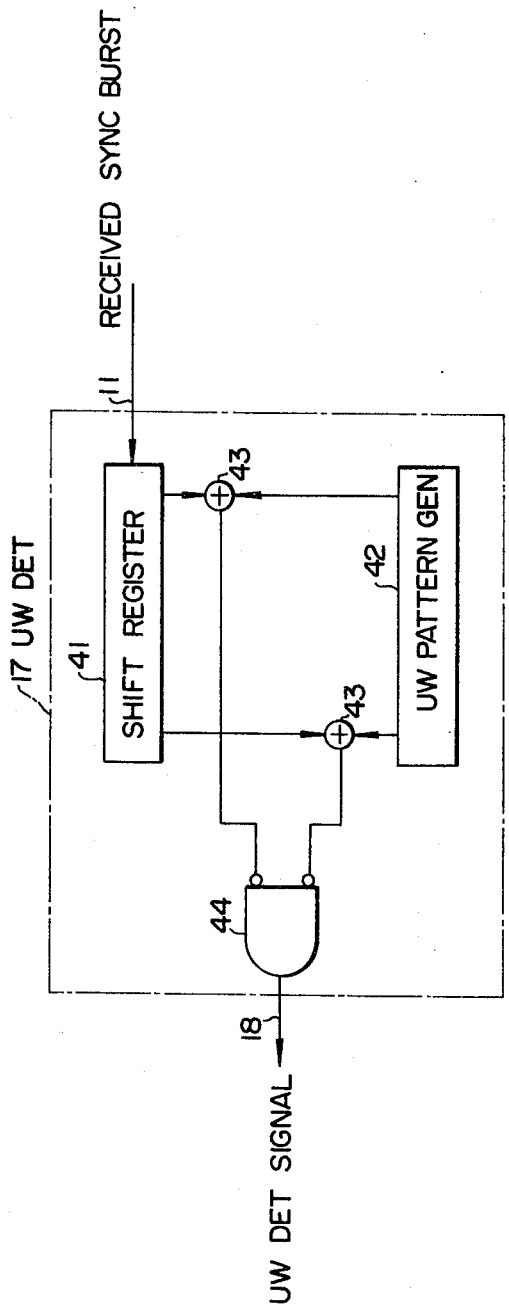
FIG. 8 is a detailed circuit diagram of one example of the UW detector circuit as shown in FIG. 7.

FIG. 8 illustrates one example of the unique word detector 17. The synchronization burst 11 is supplied to a shift register 41 of the unique word detector 17. The length of the shift register 41 is equal to that of the unique word. Each bit stored in the shift register 41 and a predetermined output from a unique word pattern generator 42 are compared with each other by means of an exclusive OR gate circuit 43; and when all the bits are coincident with each other, a unique word detect signal 18 is generated as the output from an AND gate circuit 44. The unique word detection signal 18 is used as a signal for indicating the reference of time and is employed as a timing signal for examining coincidence/non-coincidence of the output from the metric pattern generator 13 with a received synchronization burst.

Namely, the output from the timing generator 19 is divided into two: one timing signal $20_1$ becomes a control signal for directly controlling the scale-of-$l$ counters $16_1$ to $16_{2K}$ and the other is applied to a timing generator 23 through an $l$ frame counter 22 to generate a timing signal $20_2$ of each frame, which becomes a control signal for clearing the scale-of-$l$ counters $16_1$ to $16_{2K}$. Accordingly, in FIG. 7, the control signal $20_1$ starts the scale-of-$l$ counters $16_1$ to $16_{2K}$ only when the metric bits MB (the number of which is 2K) of the synchronization burst SB are all stored in the shift register 12, and control signal $20_2$ resets the scale-of-$l$ counters for regularly measuring the phase error of the synchronization burst SB sequentially received $l$ times in succession. Reference numerals $21_1$ to $21_{2K}$ identify comparators or threshold deciders for deciding whether error decided values indicated by the scale-of-$l$ counters $16_1$ to $16_{2K}$ is in excess of a threshold value $m$ or not.

The outputs from the comparators $21_1$ to a $21_{2K}$ are applied to bit-number decision section of a phase error decision circuit 25, by which the number of bits correctly received is decided. The other output 24 from the timing generator 23 is a control signal for actuating the correctly-received-bit-number decision section once for $l$ reception of the synchronization burst SB. The decision signal derived from the correctly-received-bit-number decision section is applied to a phase error decision section to decide the aforesaid phase error $y_i$ and quantize it, thereafter providing a signal 26 of a phase error (corresponding to $y_i^*$ previously mentioned).

Figure 9:
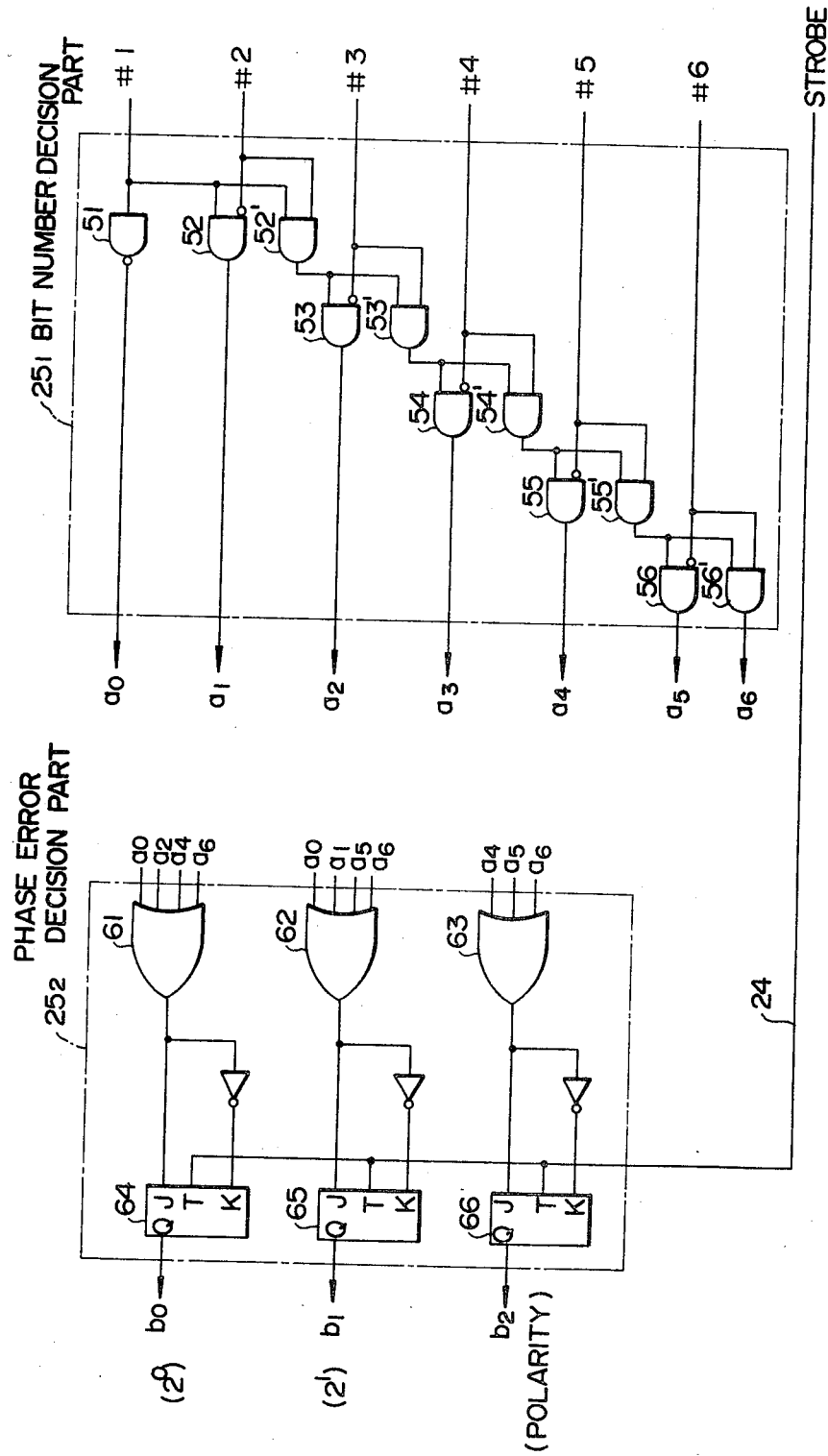
FIG. 9 is a detailed circuit diagram of one example of the phase error decision circuit as shown in FIG. 7.

FIG. 9 shows one example of the phase error decision circuit 25 which comprises a bit-number decision section $25_1$ and a phase error decision section $25_2$. In bit-number decision section $25_1$, the outputs from the comparators $21_1$ to $21_{2K}$ are taken such that $K = 3$ and signals No. 1 to No. 6 are applied to gate circuits 51, 52, 52', 53, 53', 54, 54', 55, 55', 56 and 56', respectively. Namely, the signal No. 1 is directly applied as an input to the NAND gate circuit 51 and AND gate circuits 52 and 52'. = signal No. 2 and an inverted signal of signal No. 2 are also applied to the AND gate circuits 52 respectively and 52'. The output from the AND gate circuit 52' and an inverted signal of signal No. 3 is applied to the AND gate circuit 53; and the output from the AND gate circuit 52' and signal No. 3 are applied to the AND gate circuit 53' similar connections are made to AND gates 54, 54', 55, 55', 56 and 56'. The output from the AND gate circuit 55' and signal No. 6 are applied to the AND gate circuit 56'. The outputs from the NAND gate circuit 51 and the AND gate circuits 52 to 56 and 56' are taken as $a_0$, $a_1$ to $a_5$ and $a_6$, respectively. Next, in the phase error decision section $25_2$, OR gate circuits 61, 62 and 63 are respectively connected in series to JK flip-flops 64, 65 and 66. When the outputs $a_0$, $a_2$, $a_4$ and $a_6$ from the bit-number decision section $25_1$ are applied to the OR gate circuit 61, an amount of phase correction $2^0$ is derived as a Q output $b_0$ from the flip-flop 64 and when the output $a_0$, $a_1$, $a_5$ and $a_6$ from the bit-number decision $25_1$ are applied to the OR gate circuit 62, an amount of phase correction $2^1$ is derived as a Q output $b_1$. By applying the outputs $a_4$, $a_5$ and $a_6$ from the bit-number decision section $25_1$ to the OR gate circuit 63, the polarity of the amount of phase correction can be provided as a Q output $b_2$ of the flip-flop 66. The flip-flops 64, 65 and 66 are controlled by the output 24 from the timing generator 23.

With such a construction, the signals No. 1 to No. 6, which are the outputs from the six comparators when $k = 3$, are examined by the bit-number decision section $25_1$ and the number of the comparators whose outputs are 1 is counted until the output from any of the comparators becomes 0. This number is the length of the correctly received metric bit. This length is compared with a predetermined metric bit $k$ (in this case, $k = 3$) and a necessary amount of phase correction is determined. Namely, by applying such combinations of the outputs $a_0$ to $a_6$ from the bit-number decision section $21_1$ as mentioned previously to the OR gate circuits 61 and 62 of the phase error decision section $25_2$, an amount of phase correction is derived in the form of a binary code from the flip-flops 64 and 65 and its polarity is derived from the flip-flop 66. For example, if the number of those comparators whose outputs are 1 is the same as length $k = 3$, an output 0 is provided; if longer by 1 bit, an output −1 is provided; and if shorter by 2 bits, an output +2 is provided. This is applied to a subtractor circuit 27 of FIG. 7 as a phase error signal 26 expressed by the aforesaid quantized phase error $y_i^*$.

On the other hand, a previously phase corrected value signal 29 corresponding to the aforesaid $x_{i-1}$(in case of $n=1$), stored in a phase corrected value memory circuit 28, is applied to the subtractor circuit 27 to be subtracted from the aforesaid phase error $y_i^*$ to provide a phase corrected value signal 30 corresponding to the aforementioned $(y_i^* - x_{i-1})$, which is fed to the phase corrected value memory circuit 28 and the phase control circuit 9 in FIG. 9.

The subtractor circuit 27 is so controlled by a round trip counter 31 actuated every $1/n$ round trip at the frame timing branched from the N frequency divided output of variable frequency divider 2 described later.

The phase control circuit 9 is formed with a frequency dividing ratio controller 29, which changes the frequency dividing ratio of the variable frequency divider 2 into three stages (i.e., N − 1, N and N + 1), by using signals concerning the required phase correction value supplied from the subtractor circuit 27. As a result of this, the transmit phase of the synchronization burst is changed.

FIG. 10 shows one example of each of the frequency dividing ratio controller 29 and the variable frequency divider 2 whose frequency dividing ratio is controlled thereby. Namely, the phase corrected value signal 30 is stored in a down counter 71 and its inverted output is applied to an AND gate circuit 72, whose output is applied to an AND gate circuit 76 for N frequency dividing use. The output of AND gate circuit 72 is also is inverted and applied through an AND gate circuit 73 to an AND gate circuit 75 for (N − 1) frequency dividing use together with a polarity signal 30'. The outputs from the AND gate circuits 75 and 76 are applied through an OR gate circuit 77 to an (N + 1) counter 78 to clear it. To the other inputs of the AND gate circuits 75 and 76 are supplied N − 1 and N decode output of the (N + 1) counter 78, respectively. From a decode 0 output is derived a frame timing and this output is applied to one input of the AND gate circuit 74, while the inverted output of the AND gate circuit 72 is applied to the other input of the AND gate circuit 74. The output, a clock is applied to the down counter 71 to actuate it.

With such a construction as described above, if the phase corrected value stored in the down counter 71 is not zero, the AND gate circuits 73 and 75 and the OR gate circuit 77 are turned on in accordance with the polarity of the value to produce an instruction for (N − 1) frequency division, by which the variable frequency divider serves as an (N − 1) frequency divider. In this case, each time the frame timing is derived from the (N + 1) counter 78, the content of the down counter 71 is subtracted one by one and such an operation is repeated until the content of the down counter 71 becomes zero. When the output from the down counter 71 is reduced to zero, the AND gate circuit 76 and the OR gate circuit 77 are turned on to provide an instruction for N frequency division and the variable frequency divider acts as an N frequency divider. Further, while neither the N frequency dividing instruction nor the (N − 1) frequency dividing instruction is provided, the variable frequency divider serves as an (N − 1) frequency division, the phase of the frame timing is advanced by one bit of the basic clock and, by (N + 1) frequency division, the phase of the frame timing is delayed by one bit. As a result of this, the transmit phase of the synchronization burst signal can be changed.

As has been described in the foregoing, according to this invention, the decision of the decided phase error of the synchronization burst SB is effected by achieving the phase error measurement a plurality of times, so that the transmit phase of the synchronization burst SB can be controlled with accuracy. Further, with this invention, it is possible to provide a transmit phase control system of synchronization burst in the SDMA/TDMA satellite communication system in which the phase control interval is short and the accuracy of synchronization is not deteriorated.

It will be apparent that many modifications and variations may be effected without departing from the scope of the novel concept of this invention.

What is claimed is:

1. A synchronization burst transmit phase control system for an SDMA/TDMA satellite communication system including earth stations and a satellite, said satellite produceing a synchronization window through which a synchronization burst transmitted from each earth station is returned by said satellite, and a plurality of data windows for communication between predetermined groups of earth stations and between the earth stations of each group, based on a timing signal of said satellite, wherein a round trip period is defined as the time commenced by a synchronization burst transmitted from an earth station and terminated when said same synchronization burst returns to said same earth station; each of said earth stations comprising:

transmitting means for phase correcting each successive synchronization burst at a corresponding phase correction instant, and transmitting said phase corrected synchronization bursts to said satellite;

receiving means for receiving each synchronization burst transmitted by said transmitting means and returned from said satellite;

measuring means for measuring an error between the phase of the received synchronization burst of said earth station and that of the synchronization window, a plurality of times $l$ during a corresponding phase control interval, and producing a measured value for each error measurement, wherein said phase control interval is defined as the time between successive phase correction instants;

deciding means for determining a decided phase error as a function of said $l$ phase error measurements and producing a phase corrected value; and control means for receiving said phase corrected value and controlling the transmit phase of the synchronization burst with a phase control signal at a corresponding phase correction instant.

2. A synchronization burst transmit phase control system according to claim 1, wherein said synchronization burst transmitting means comprises a reference clock signal generator, a variable frequency divider for producing a frame timing as a function of the output from said reference clock signal generator and said phase corrected value, a synchronization burst generator for producing a synchronization burst as a function of the output from said variable frequency divider, and a modulator for modulating the output from said synchronization burst generator and transmitting it to said satellite; wherein said synchronization burst receiving means comprises a demodulator for receiving and demodulating the synchronization burst returned from said satellite and a station identification circuit for identifying the synchronization burst demodulated by said demodulator; wherein each synchronization burst comprises $2k$ metric bits wherein $k$ is a predetermined integer; wherein said phase error measuring means comprises a $2k$-bit shift register for sequentially receiving said metric bits ($2k$ bits) of said received synchronization burst, a metric pattern generator for generating a metric pattern of said synchronization burst, $2k$ exclusive OR circuits for comparing the outputs from said shift register and said metric pattern generator for each corresponding bit, $2k$ scale-of-$l$ counters each receiving the output from a corresponding one of said $2k$ exclusive OR circuits, and $2k$ threshold deciders each receiving the output from a corresponding one of said $2k$ scale-of-$l$ counters; wherein said phase error deciding means comprises a bit-number deciding unit for deciding the bit-number of correctly received metric bits at every reception of said synchronization burst and a phase error deciding unit for deciding the phase error based on the decided bit-number; and wherein said synchronization burst transmit phase control means comprises means for generating a phase control signal for controlling the frequency dividing ratio of said variable frequency divider as a function of said phase corrected value.

3. A synchronization burst transmit phase control system according to claim 1, wherein said phase error deciding means includes calculating means for determining the present phase corrected value by subtracting the sum of phase correctted calues of a predetermined number of preceding phase correction instants from the decided phase error at the present phase correction instant wherein said predetermined number is greater than 1.

4. A synchronization burst transmit phase control system according to claim 2, wherein said phase error deciding means includes calculating means for determining the present phase corrected value by subtracting the sum of phase corrected values of a predetermined number of preceding phase correction instants from the decided phase error at the present phase correction instant wherein said predetermined number is greater than 1.

5. A synchronization burst transmit phase control system according to claim 4, wherein said calculating means comprises a phase corrected value memory circuit for storing the sum of phase corrected values of said predetermined number of preceding phase correction instants, a subtractor circuit for subtracting the output from said phase corrected value memory circuit from the decided phase error at said present phase correction instant, and a round trip counter for actuating said subtractor circuit at each phase correction instant.

6. A synchronization burst transmit phase control system according to claim 3, wherein said calculating means comprises a phase corrected value memory circuit for storing the sum of phase corrected values of said predetermined number of preceding phase correction instants, a subtractor circuit for subtracting the output from said phase corrected value memory circuit from the decided phase error at said present phase correction instant, and a round trip counter for actuating said subtractor circuit at each phase correction instant.

* * * * *

UNITED STATES PATENT AND TRADEMARK OFFICE
CERTIFICATE OF CORRECTION

PATENT NO. : 3,995,111
DATED : November 30, 1976
INVENTOR(S) : Yoshikazu Tsuji et al It is certified that error appears in the above-identified patent and that said Letters Patent are hereby corrected as shown below:

Column 1, line 36, "saake" should be --sake--.
Column 4, line 31, after "is" insert --a--.
Column 4, line 32, change "devider" to --divider--.
Column 4, line 46, delete "of".
Column 5, equation (2) should be $-- x_i = y_i^* - x_{i-1} --$.
Column 5, line 36, "$y_i*$" should be $-- y_i^* --$.

Column 6, lines 27 and 28 /"$x_i = y_i^* - \sum_{k=1}^{3} x_{i-k}$" should be $-- x_i = y_i^* - \sum_{k=1}^{3} x_{i-k} --$.

Column 6, equation (4) /"$x_i = y_i^* - \sum_{k=1}^{n} x_{i-k}$" should be $-- x_i = y_i^* - \sum_{k=1}^{n} x_{i-k} --$.

Column 6, Chart line 1 /"$x_3 = y^*_3 - x_2$" should be $-- x_3 = y_3^* - x_2 --$.

Column 6, Chart line 4 /"$x_4 = y^*_4 - x_3$" should be $-- x_4 = y_4^* - x_3 --$.

Column 7, line 10 /"$A = (y_2 + \sum_{k=3}^{i-2} d_k - (y_2 + \sum_{k=3}^{i-2} d_k)^*,$" should be $-- A = (y_2 + \sum_{k=3}^{i-2} d_k) - (y_2 + \sum_{k=3}^{i-2} d_k)^* --$

UNITED STATES PATENT AND TRADEMARK OFFICE
CERTIFICATE OF CORRECTION

PATENT NO. : 3,995,111
DATED : November 30, 1976
INVENTOR(S) : Yoshikazu Tsuji et al It is certified that error appears in the above–identified patent and that said Letters Patent are hereby corrected as shown below:

Column 7, lines 35 to 39 "$A = (y_{n+1} + \sum_{k=n+2}^{i-(n+1)} dk) - y_{n+1} + \sum_{k=n+2}^{i-(n+1)} dk)*$ and"

should be:

-- $A = (y_{n+1} + \sum_{k=n+2}^{i-(n+1)} dk) - (y_{n+1} + \sum_{k=n+2}^{i-(n+1)} dk)*$ and--.

Column 9, line 16, change "52 respectively and 52'" to --52 and 52' respectively--.
Column 9, line 20, after "53'" insert a period.
Column 9, line 20, change "similar" to --Similar--.
Column 10, line 3, delete "$(y_i* - x_{i-1})$" and substitute --$(y_i^* - x_{i-1})$--.
Column 10, line 26, delete "is".

Signed and Sealed this

Fifth Day of April 1977

[SEAL]

Attest:

RUTH C. MASON
Attesting Officer

C. MARSHALL DANN
Commissioner of Patents and Trademarks